(12) United States Patent
Kendall et al.

(10) Patent No.: US 12,287,828 B2
(45) Date of Patent: Apr. 29, 2025

(54) QUALITY OF SERVICE MONITORING FOR STREAMING CONTENT

(71) Applicant: Disney Enterprises, Inc., Burbank, CA (US)

(72) Inventors: Philip Alan Kendall, West Yorkshire (GB); Robert John Pickerill, Manchester (GB); Samuel James Alexander Halliday, Auchterarder (GB)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/329,116

(22) Filed: Jun. 5, 2023

(65) Prior Publication Data

US 2024/0070195 A1    Feb. 29, 2024

Related U.S. Application Data

(60) Provisional application No. 63/373,374, filed on Aug. 24, 2022.

(51) Int. Cl.
| | |
|---|---|
| *G06F 16/17* | (2019.01) |
| *G06F 16/174* | (2019.01) |
| *G06F 16/71* | (2019.01) |
| *G06F 16/735* | (2019.01) |

(52) U.S. Cl.
CPC .......... *G06F 16/71* (2019.01); *G06F 16/1748* (2019.01); *G06F 16/735* (2019.01)

(58) Field of Classification Search
CPC ..... G06F 16/71; G06F 16/1748; G06F 16/735
See application file for complete search history.

(56) References Cited

U.S. PATENT DOCUMENTS

| | | | | |
|---|---|---|---|---|
| 11,165,848 | B1* | 11/2021 | Larson | H04N 19/154 |
| 11,704,319 | B1* | 7/2023 | Jou | G06F 16/2452 |
| | | | | 707/722 |
| 2015/0288765 | A1* | 10/2015 | Skraparlis | H04L 69/40 |
| | | | | 709/228 |
| 2022/0020473 | A1* | 1/2022 | Arnold | G16H 20/70 |
| 2022/0030300 | A1* | 1/2022 | Periyaeluvan | H04N 21/44231 |
| 2023/0140605 | A1* | 5/2023 | Jain | G06Q 10/06393 |
| | | | | 705/7.39 |
| 2023/0214854 | A1* | 7/2023 | Colombier | G06Q 30/0641 |
| | | | | 705/7.29 |

* cited by examiner

*Primary Examiner* — Loc Tran (74) *Attorney, Agent, or Firm* — Patterson + Sheridan, LLP (57) ABSTRACT

Techniques relating to streaming video are disclosed. These techniques include identifying one or more streaming video sessions for one or more users based on a plurality of events relating to streaming video for the one or more users. The techniques further include storing data for the one or more streaming video sessions in an electronic database, based on the plurality of events, identifying a plurality of metadata relating to the events, and determining, based on a threshold value, a time to store at least a portion of the plurality of metadata in the electronic database, the time occurring after the storing the data for the one or more streaming video sessions. The techniques further include responding to a query for metrics relating to the one or more streaming video sessions by aggregating at least a portion of the stored data.

15 Claims, 6 Drawing Sheets

QUALITY OF SERVICE MONITORING FOR STREAMING CONTENT

CROSS-REFERENCE TO RELATED APPLICATIONS

This application claims benefit of U.S. Provisional Patent Application Ser. No. 63/373,374 filed on Aug. 24, 2022. The aforementioned related patent application is herein incorporated by reference in its entirety.

BACKGROUND

Many modern content providers (e.g., streaming video or audio providers) rely on sophisticated quality of service (QoS) information to service customers. For example, a streaming video service can collect numerous QoS metrics relating to use of the service. These metrics can be used to identify and assist in troubleshooting problems with the streaming service in order to improve performance and customer experiences. But gathering QoS in real-time or near real-time is extremely challenging, particularly for providers with very large numbers of customers (e.g., tens or hundreds of millions of customers). Traditional solutions for capturing and maintaining QoS information do not successfully scale to large numbers of customers.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

As noted above, capturing QoS metrics is crucial to a variety of content providers, including streaming video providers. For example, QoS metrics can be a set of metrics that identify the characteristics of video streams provided to customers. These QoS metrics can include a number of starts (e.g., a number of times users started a video stream), playback failure metrics (e.g., a number or percentage of streams that ended with an error), and a connection-induced rebuffering ratio (CIRR) (e.g., a percentage of time users are notified of buffering). These are merely examples, and QoS metrics can include a wide variety of suitable metrics. Further, while the description below focuses on streaming video as one example, this is merely an example. One or more techniques described herein could be applied to streaming audio, another suitable streaming content system, or any other QoS analytics environment.

In an embodiment, QoS metrics can be calculated using a stream of events from subscriber devices relating to videos being streamed. For example, these events can include a playback started event (e.g., identifying when a user sees the first frame of a video), a playback ended event (e.g., identifying when a user finishes watching a video, because the video concluded, the user manually exited, there was an error, or for any other suitable reason), a buffering started event (e.g., identifying that a player is unable to display content because it has not received enough of the relevant video), or a buffering ended event (e.g., identifying that a player has now received enough video to show content again). These are, again, merely examples, and any suitable events can be used.

In an embodiment, the events can be used to calculate QoS metrics. For example, a number of starts metric can be calculated using a number of playback started events received in a given time period. As another example, a playback failures metric can be calculated as the ratio of playback ended events reporting an error, compared with the total number of started events. Further, a CIRR can be calculated based on calculating a ratio of the time each stream is playing for compared with the time the stream has visibly buffered. As above, these are merely examples, and the QoS metrics can be calculated using any suitable events or other data.

Further, in an embodiment, metadata about the telemetry of video streams can be captured along with the QoS metrics. For example, metadata relating to the content delivery network (CDN) used, the streaming device used, the location of the streaming device (e.g., zip code, city, state, country, or region), or any other suitable metadata, can be captured along with the streaming events.

In an embodiment, one solution to calculating QoS metrics would be to use a three step pipeline. First, incoming events could be sessionized. This could be done by gathering all events for a given playback session and calculating the metrics for the session (e.g., buffering time and non-buffering time for each session). Second, all sessions relating to the same metadata can be aggregated and stored in a summary record (e.g., in an electronic database or any other suitable electronic repository). Finally, records describing the aggregated QoS metrics can be stored in a time series database (e.g., a specialized database optimized for handling data with a time dimensions as a primary key).

While this solution works in some circumstances, it has significant drawbacks. For example, the volume of data to be ingested for a popular streaming service (e.g., a streaming service with tens of hundreds of millions of users) can make the aggregation step prohibitively computationally expensive. Particularly where data has high cardinality (e.g., minimal overlap across metadata) the aggregation becomes very ineffective and inadequate. For example, assume a QoS metric describes a number of times a user in a particular zip code starts streaming a particular item of content in a short time window (e.g., two seconds). This data has high cardinality, because it is very unlikely that many records will overlap (e.g., it is very unlikely that many users within a given zip code will start the same content item within two seconds). This high cardinality means that aggregation is likely to be ineffective, and computationally very expensive.

In an embodiment, one or more techniques described herein provide technical solutions to one or more of these problems. For example, an improved technique can keep event sessionization (e.g., because sessionization can be efficiently parallelized across multiple compute nodes), but can remove (or improve) the aggregation step. In particular, a solution that aggregates data before storage (e.g., as described above) is effectively calculating the results to a huge number of possible queries on the data, before the data is stored and even though only a fraction of the queries will ever be asked. Instead, sessionized events can be stored directly in a repository (e.g., a relational database). Aggregation can then be done when a specific query is made for the data. This effectively moves the aggregation from ingest time, when an extremely high number of events with a high cardinality makes aggregation both computationally expensive and ineffective, to query time. This provides a significantly more computationally efficient solution, as compared to prior techniques, among other advantages. Further, multiple additional techniques can be used to further improve both sessionization, as discussed further below with regard to FIG. 5, and querying, as discussed further below with regard to FIG. 6.

Figure 1:
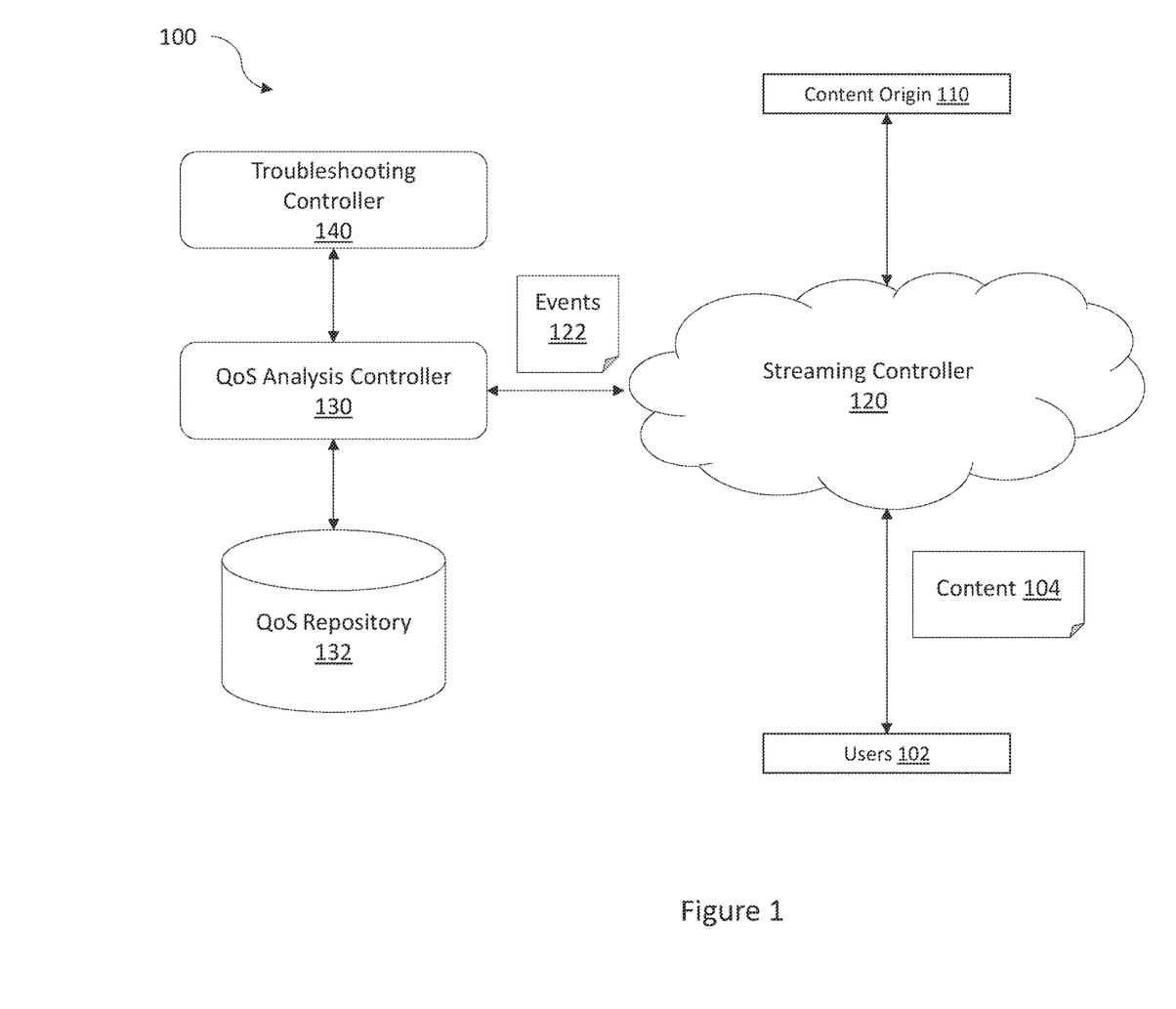
FIG. 1 illustrates a computing environment for quality of service monitoring for streaming video, according to one embodiment.

FIG. 1 illustrates a computing environment 100 for quality of service monitoring for streaming video, according to one embodiment. One or more users 102 stream an item of content 104 (e.g., streaming video) from a streaming controller 120. For example, the streaming controller 120 can include a number of content delivery systems (e.g., caches, repositories, etc.) to retrieve the content 104 from a content origin 110 and provide the content 104 to the users 102.

In an embodiment, a QoS analysis controller 130 can be used to capture and maintain QoS metrics. For example, as described above the QoS metrics can include a number of starts, playback failure metrics, and a CIRR, among other suitable metrics. The QoS analysis controller 130 can calculate the QoS metrics using one or more events 122 received from the streaming controller 120, and can store the QoS metrics in a QoS repository 132. The QoS repository 132 be a relational database, another suitable electronic database, or any other suitable electronic repository.

In an embodiment, a troubleshooting controller 140 can use QoS metrics collected by the QoS analysis controller 130 (e.g., QoS metrics maintained in the QoS repository 132) to identify and correct errors and problems. For example, the troubleshooting controller 140 can use playback failure metrics, or a CIRR, along with metadata (e.g., describing which streaming video player was associated with the QoS metrics, the general geographic location of the users associated with the metrics) to identify problems with particular streaming players or communication network pathways, and can attempt to remedy those problems. The troubleshooting controller 140 can provide results on-demand (e.g., on-demand to engineers attempting improve customer experience), or automatically (e.g., based on identifying issues or potential issues as they occur).

For example, the troubleshooting controller can provide automatic alerts to customer experience engineers to remedy problems, or can attempt to remedy problems automatically (e.g., by changing the allocation of compute and storage resources). Suitable remedies can include moving traffic between CDNs, moving traffic to different parts of a cloud infrastructure, or to a different cloud infrastructure, notifying an internet service provider (ISP) or other provider of a potential issue, changing characteristics of the content provided to users to alleviate issues with playing the content, among other actions. These are merely examples, and the troubleshooting controller can facilitate identifying, and correcting, numerous issues using a variety of remedies.

In an embodiment the components of the computing environment 100 (e.g., the users 102, streaming controller 120, content origin 110, QoS analysis controller 130, troubleshooting controller 140, and QoS repository 132) are connected using a communication network. For example, the components of the computing environment 100 can be connected using a local area network (LAN), a wide area network (WAN), the Internet, or any other suitable communication network. Further, the components of the computing environment 100 can be connected to the communication network using any suitable network connection, including a wired connection (e.g., an Ethernet or fiber optic connection), a wireless connection (e.g., a WiFi connection), a cellular connection, or any other suitable network connection.

Further, in an embodiment, any (or all) of the streaming controller 120, content origin 110, troubleshooting controller 140, QoS analysis controller 130, and QOS repository 132 can be implemented using a suitable cloud computing infrastructure (e.g., a public cloud, a private cloud, a hybrid cloud, or any other suitable cloud computing infrastructure). Alternatively, or in addition, one or more of these components can be implemented using on-premises compute infrastructure (e.g., a collection of on-premises servers) or any other suitable compute infrastructure.

Figure 2:
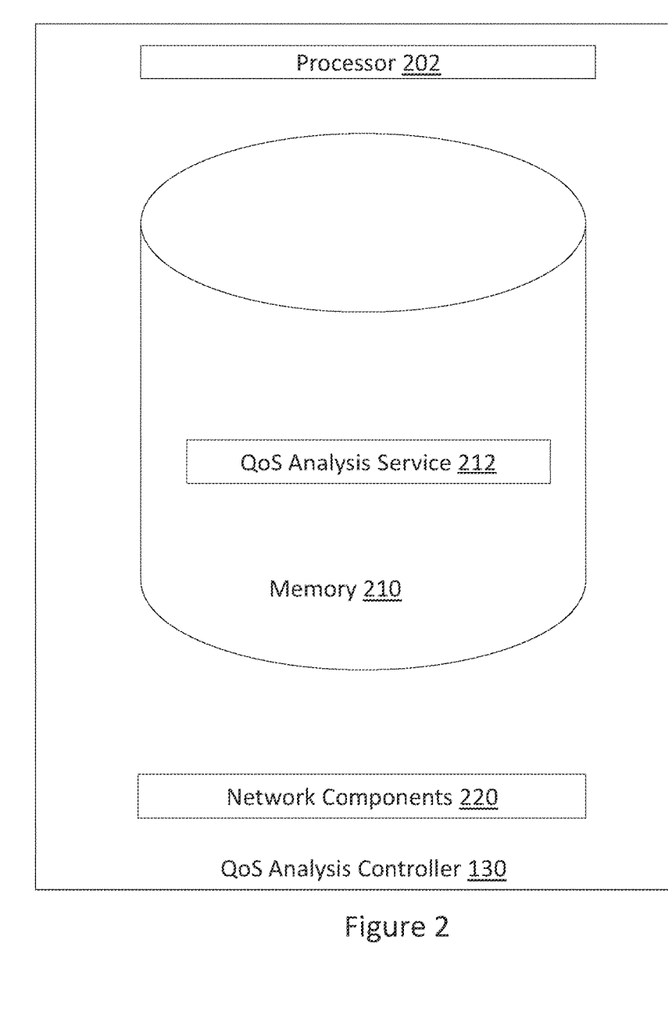
FIG. 2 is a block diagram illustrating a controller for quality of service monitoring for streaming video, according to one embodiment.

FIG. 2 is a block diagram illustrating a controller for quality of service monitoring for streaming video, according to one embodiment. A QoS analysis controller 130 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the QoS analysis controller 130 to interface with a suitable communication network (e.g., a communication network interconnecting various components of the computing environment 100 illustrated in FIG. 1, or interconnecting the computing environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the QoS analysis controller 130. The program code is generally described as various functional "applications" or "modules" within the memory 210, although alternate implementations may have different functions and/or combinations of functions. Within the memory 210, the QoS analysis service 212 facilitates capture, recording, and querying QoS metrics. This is discussed further below with regard to FIGS. 3-6.

While the QoS analysis controller 130 is illustrated as a single entity, in an embodiment, the various components can be implemented using any suitable combination of physical compute systems, cloud compute nodes and storage locations, or any other suitable implementation. For example, the QoS analysis controller 130 could be implemented using a server or cluster of servers. As another example, the QoS analysis controller 130 can be implemented using a combination of compute nodes and storage locations in a suitable cloud environment. For example, one or more of the components of the QoS analysis controller 130 can be implemented using a public cloud, a private cloud, a hybrid cloud, or any other suitable implementation. Further, the QoS analysis controller 130 may include one or more computing platforms, such as computer servers for example, which may be co-located, or may form an interactively linked but distributed system, such as a cloud-based system.

Further, although FIG. 2 depicts the QoS analysis service 212 as being located in the memory 210 that representation is also merely provided as an illustration for clarity. More generally, the QoS analysis controller 130 may include one or more computing platforms, such as computer servers for example, which may be co-located, or may form an interactively linked but distributed system, such as a cloud-based system. As a result, the processor 202 and memory 210 may correspond to distributed processor and memory resources within the computing environment 100. Thus, it is to be understood that the QoS analysis service 212 may be stored remotely within the distributed memory resources of the computing environment 100.

Figure 3:
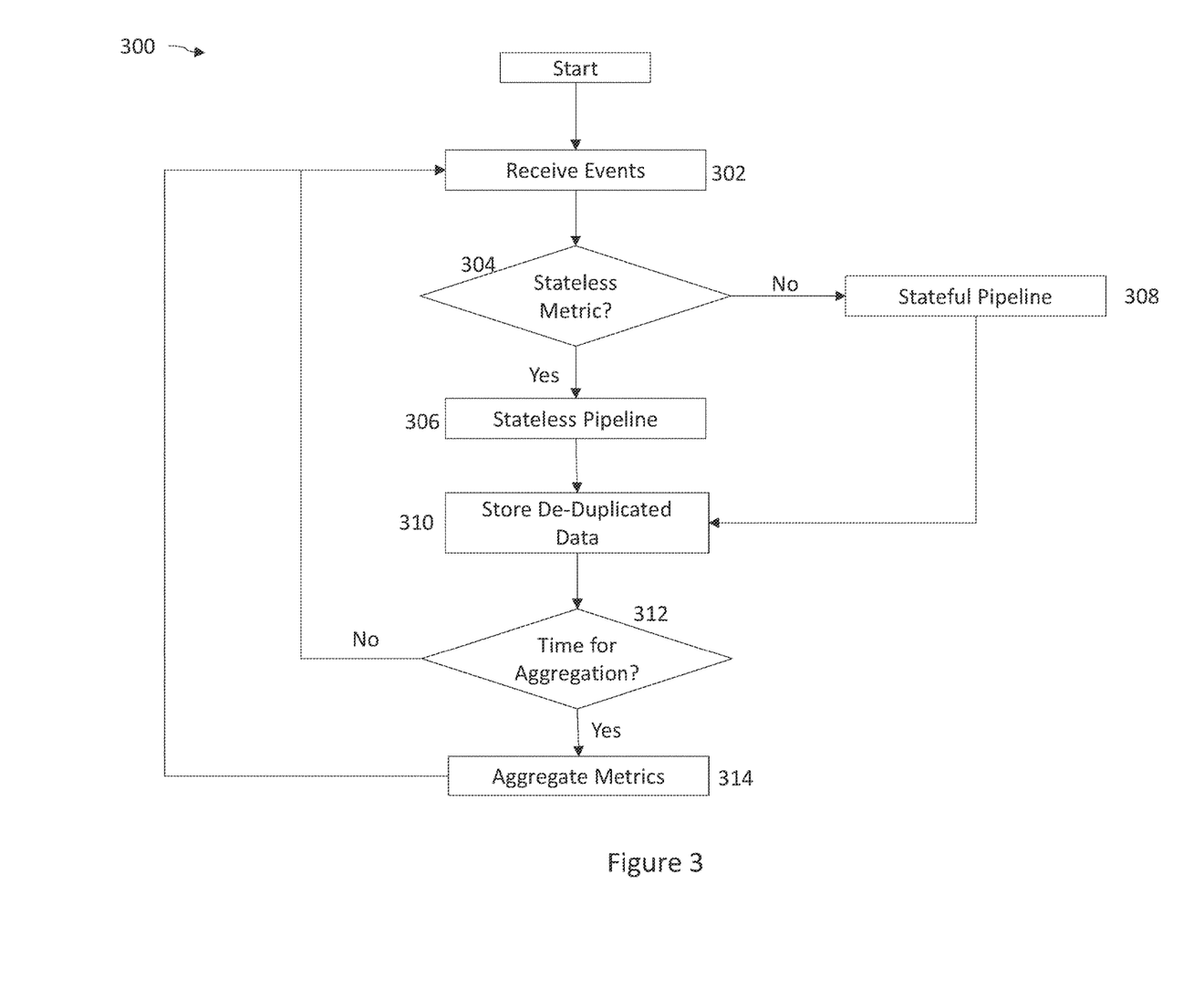
FIG. 3 is a flowchart illustrating for quality of service monitoring for streaming video, according to one embodiment.

FIG. 3 is a flowchart 300 illustrating for quality of service monitoring for streaming video, according to one embodiment. At block 302, a QoS analysis service (e.g., the QoS analysis service 212 illustrated in FIG. 2) receives events. As discussed above, in an embodiment a content service (e.g., a streaming video service, a streaming audio service, or any other suitable service) generates events for user sessions. For example, these events can include a playback started event, a playback ended event, a buffering started event, or a buffering ended event, among many other examples of suitable events. The QoS analysis service can receive these events individually (e.g., a stream of individual events), in groups (e.g., multiple events at the same time), or in any other suitable manner.

At block 304, the QoS analysis service determines whether to generate a stateful metric, or a stateless metric. In an embodiment, stateless metrics can be recorded directly in a repository (e.g., the QoS repository 132 illustrated in FIG. 1), along with associated metadata. Stateful metrics, by contrast, relate to a state of a given user session. For example, a buffering ended event can signal that a session has been in a buffering state, and the buffering has concluded. The QoS analysis service can record a buffering duration metric, that represents the time spent buffering.

In an embodiment, the QoS analysis service can use separate pipelines for generating stateless and stateful metrics. For example, if the QoS analysis service is generating a stateless metric (e.g., based on analyzing the received event or events), the flow proceeds to block 306 and the QoS analysis service uses a stateless pipeline to generate the stateless metric. Alternatively, the flow proceeds to block 308 and the QoS analysis service uses a stateful pipeline to generate the stateful metric. This is merely an example, and metrics can be generated using any suitable number of pipelines (e.g., a single pipeline for all metrics, more than two pipelines, or any other suitable architecture).

At block 306, the QoS analysis service uses a stateless pipeline to generate a stateless metric. In an embodiment, the QoS analysis service performs minimal processing on each event, in the stateless pipeline. For example, the QoS analysis service can record one row per event received (e.g., in the QoS repository 132 illustrated in FIG. 1). This row can include an identifier (e.g., a unique identifier for the session) and a timestamp of the event. Further, the QoS analysis service can record a row for each metadata value contained within the event. In an embodiment, the QoS analysis service treats each recorded row as an immutable ledger, meaning rows are not modified after they are written.

At block 308, the QoS analysis service uses a stateful pipeline to generate a stateful metric. In an embodiment, each user session can have one or more orthogonal states at any given point in time. This can include a state reflecting the video play status (e.g., playing, paused, buffering, or any other suitable state), a state reflecting the content being viewed (e.g., main content or advertising content), a state reflecting interactivity (e.g., watching without interactivity or using an interactive application), or any other suitable state or combination of multiple states. These are merely examples.

The QoS analysis service uses the received event, or events, to generate a metric reflecting the session state. For example, as discussed above, the QoS analysis service can use a buffering ended event to identify that a buffering session state has concluded, and can record a buffering duration metric. This is merely one example of a stateful metric, and the QoS analysis service can generate any suitable stateful metric using the stateful pipeline. Further FIG. 5, below, illustrates additional optimization techniques that can be used to improve a stateful pipeline. In an embodiment, the QoS analysis service again treats each recorded row as an immutable ledger, meaning rows are not modified after they are written.

At block 310, the QoS analysis service stores de-duplicated data. For example, as discussed above event data can include various metadata relating to a session (e.g., general geographic location, streaming device used, CDN used, or any other suitable metadata). This metadata typically does not change frequently, for a given session. For example, a user typically continues to use the same streaming device throughout a session, typically uses the same CDN throughout a session, and typically does not change their general geographic location frequently.

In an embodiment, the QoS analysis service can de-duplicate this metadata and record the metadata periodically using a threshold value at a target time (e.g., once per hour) rather than with every received event. This can dramatically reduce the load on the storage repository (e.g., a relational database) and improve scalability. But recording the de-duplicated metadata periodically could have an unintended side effect. If all metadata is written at the same time (e.g., at the top of the hour), the repository receives a significant spike in load at that time that can cause errors and reduce scalability. In an embodiment, this can be resolved by stochastically writing the de-duplicated metadata at various times as the next deadline approaches, to spread out the load on the repository. This is discussed further, below, with regard to FIG. 4.

At block 312, the QoS analysis service determines whether it is time for aggregation. In an embodiment, as discussed above, the metrics and events are initially ingested and stored in a repository without aggregation, and queries to the repository are used for aggregation. These queries are discussed further, below, with regard to FIG. 6.

At specified intervals, however, it may be advantageous to aggregate the stored metrics and events to improve the efficiency of future queries. For example, the QoS analysis service can intermittently (e.g., every few hours) aggregate the stored data for use in future queries. This provides many advantages. First, events can initially be ingested rapidly and efficiently in a scalable fashion, enabling effectively real-time queries on events. But as discussed above this may involve recording every received event in a repository, which can become computationally expensive over time as the number of events continues to grow.

Rather than maintaining a record of all events, in perpetuity, the QoS analysis service can aggregate events periodically after the events have been ingested, and when latency is no longer a significant issue (e.g., latency on the order of minutes). The QoS analysis service can aggregate the ingested metrics and events for a given time period (e.g., for a few hours or minutes). The individually ingested events can then be deleted, and the aggregated metrics can be maintained for future queries. This provides the advantage of real-time, or near real-time, ingestion and querying of events and metrics with minimal latency, while avoiding the need to store all events in perpetuity. Further, the aggregated metrics can be used for future queries, improving the computational efficiency of the queries.

Thus, at block 312 the QoS analysis service can determine whether it is time for aggregation (e.g., a time period has expired). If so, the flow proceeds to block 314 and the QoS analysis service aggregates the metrics (e.g., aggregates the events and metrics previously ingested). In an embodiment, the QoS analysis service maintains the aggregated metrics and deletes the individual events.

In an embodiment, the QoS analysis service can use a two-step process for aggregation. First, the QoS analysis service can export all data for a particular time period (e.g., an hour) into a temporary storage location. Second, the QoS analysis service can aggregate the exported data. This can generate a set of files representing the value of particular metrics for a given time period (e.g., a minute). The flow then returns to block 302, and unfiltered queries can be performed on the aggregated data.

Returning to block 312, if the QoS analysis service determines that it is not time for aggregation (e.g., a timer has not expired) the flow returns to block 302. Further, in an embodiment, the QoS analysis service can identify a time for aggregation independently of receiving events. For example, the QoS analysis service can use a timer to identify a time for aggregation, separately from receiving events.

Figure 4:
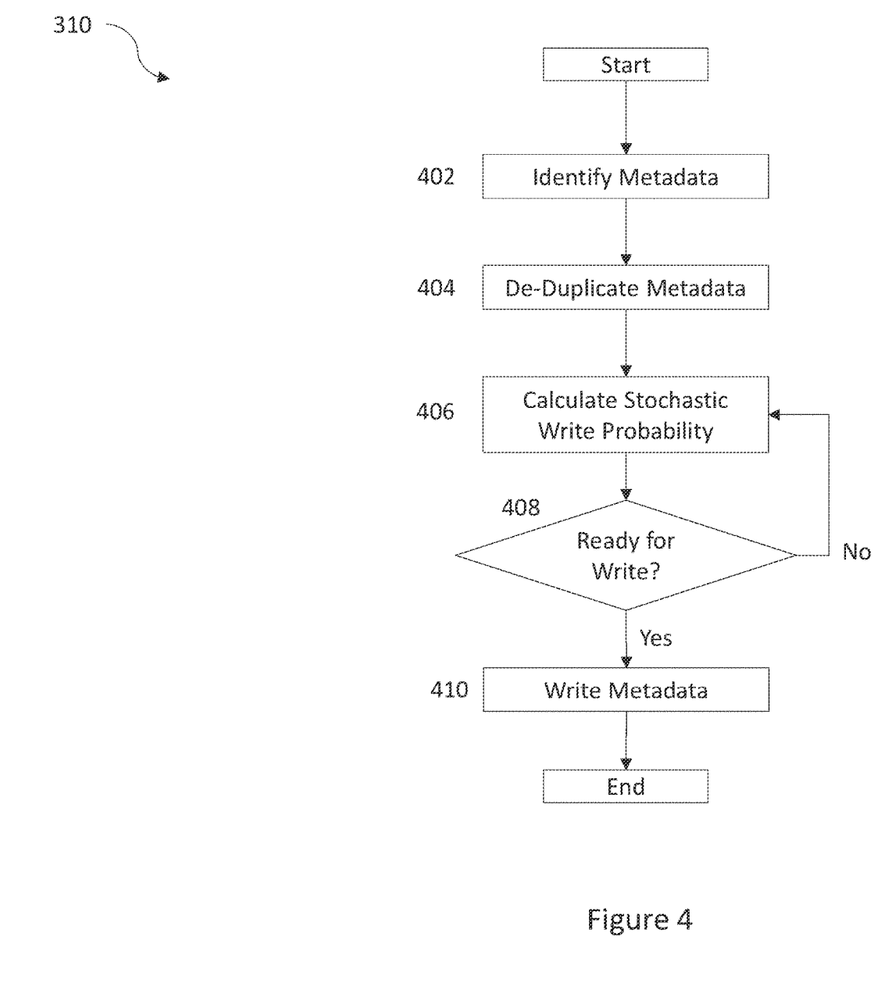
FIG. 4 is a flowchart illustrating storage of de-duplicated quality of service data as part of quality of service monitoring for streaming video, according to one embodiment.

FIG. 4 is a flowchart illustrating storage of de-duplicated quality of service data as part of quality of service monitoring for streaming video, according to one embodiment. In an embodiment, FIG. 4 corresponds with block 310 illustrated in FIG. 3, above. At block 402 a QoS analysis service (e.g., the QoS analysis service 212 illustrated in FIG. 2) identifies metadata. For example, as discussed above event data can include various metadata relating to a session (e.g., general geographic location, streaming device used, CDN used, or any other suitable metadata).

At block 404, the QoS analysis service de-duplicates the metadata. In an embodiment, this metadata typically does not change frequently, for a given session. The QoS analysis service can identify a metadata value for a given session over a particular time period (e.g., an hour). In an embodiment, the metadata value does not change, for the session and the time period. If the metadata value does change, the QoS analysis can record the change (e.g., record the prior metadata value to a repository and record the new metadata value at the appropriate time, as discussed below), maintain only the new value (e.g., to be recorded at the appropriate time), or use any other suitable technique.

At block 406, the QoS analysis service calculates a stochastic write probability. As discussed above in relation to block 310, in an embodiment the QoS service records the de-duplicated metadata periodically using a threshold value at a target time (e.g., hourly at the top of the hour). In an embodiment, this threshold value (e.g., one hour) is set by an administrator, user, or developer. For example, the threshold value can be set using a suitable user interface, by default without user intervention, or using any other suitable technique. Further, the threshold value can be set automatically (e.g., using machine learning (ML) or other techniques to identify a suitable threshold value). But recording all metadata at the same target time can significantly increase load on a repository, causing errors and reducing scalability. The QoS service can remedy this by stochastically writing the de-duplicated metadata values at various times approaching the desired deadline (e.g., approaching the hourly deadline).

For example, the QoS analysis service can calculate a stochastic write probability representing a probability that the QoS analysis service should write a given metadata value (or collection of metadata values) at a given time. As the time approaches the write deadline (e.g., increases in proximity to the hourly deadline), the probability of a write increases for any given metadata value or collection of metadata values, until the probability reaches 100% at the deadline. This both ensures that the metadata values are written within the desired period (e.g., hourly), and spreads out the writes stochastically, based on a proximity to the target time, to avoid overburdening the repository.

At block 408, the QoS analysis service determines whether a given metadata value, or collection of metadata values, is ready for write. As discussed above, in an embodiment this is based on the stochastic write factor calculated at block 406. If the metadata value is ready for write, the QoS analysis service proceeds to block 410 and writes the metadata. If the metadata value is not yet ready for write, the flow returns to block 406 and the QoS analysis service calculates another stochastic write factor. In an embodiment, the QoS analysis service can wait (e.g., for a specified interval) before calculating a new stochastic write factor and attempting to write the metadata.

Figure 5:
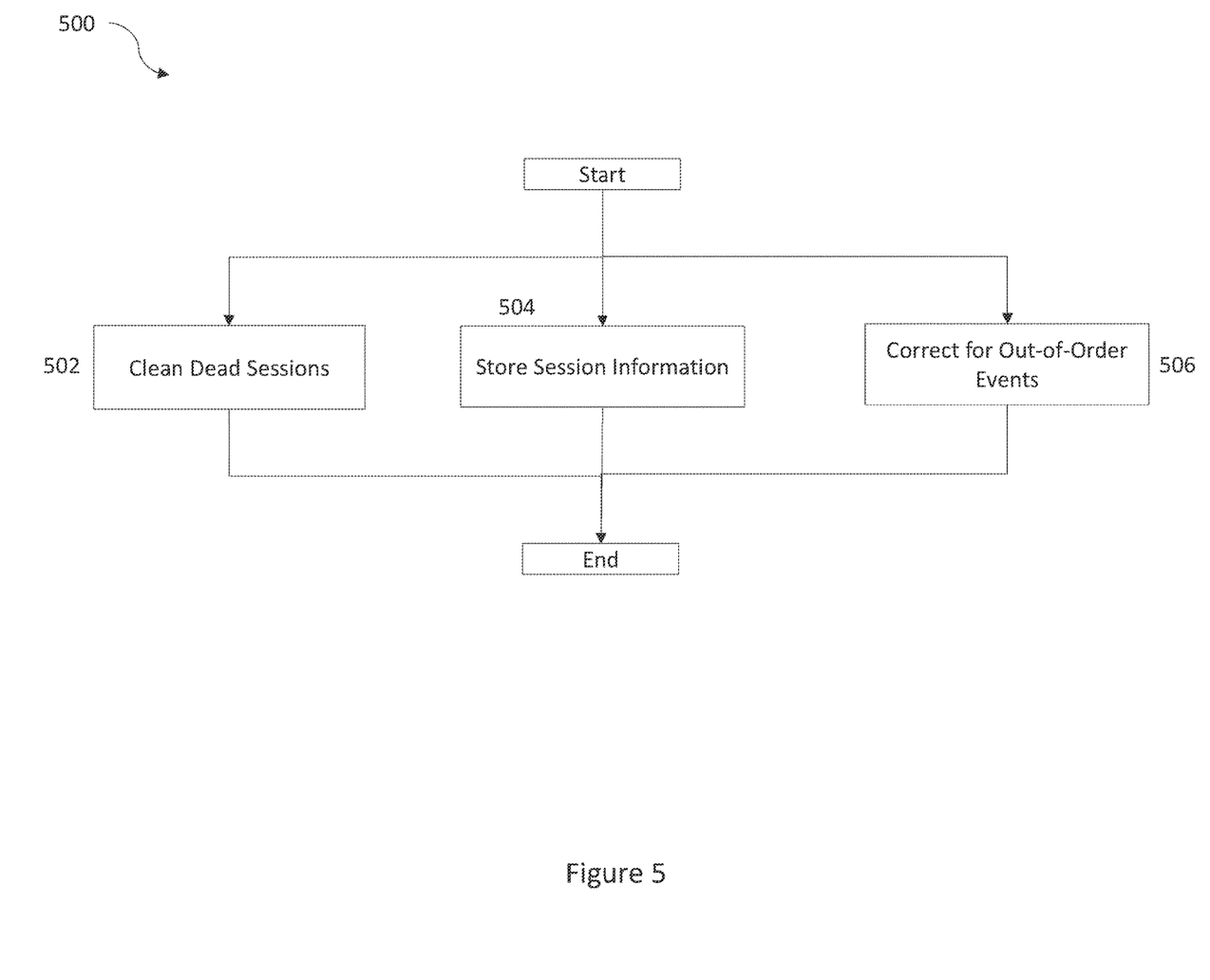
FIG. 5 is a flowchart illustrating stateful pipeline optimization techniques as part of quality of service monitoring for streaming video, according to one embodiment.

FIG. 5 is a flowchart 500 illustrating stateful pipeline optimization techniques as part of quality of service monitoring for streaming video, according to one embodiment. In an embodiment, as discussed above in relation to block 308 illustrated in FIG. 3, a stateful pipeline can be used to ingest events and generate stateful metrics (e.g., metrics that depend on a state of a session). FIG. 5 illustrates numerous optimization techniques that can be used to improve operation of the stateful pipeline.

At block 502, a QoS analysis service (e.g., the QoS analysis service 212 illustrated in FIG. 2) cleans dead sessions. In an embodiment, a content provider (e.g., a streaming video service) may lose telemetry with a user during a session. For example, a user device may lose its network connection or force a streaming video application to close during a session. As discussed above, the stateful pipeline maintains session state for ongoing user sessions (e.g., the QoS analysis service maintains a state for each ongoing session). Dead sessions can consume an increasing share of compute power and memory, over time, if they are not removed.

In an embodiment, the QoS analysis service can periodically remove dead sessions. For example, the QoS analysis service can identify sessions that have not reported any events for a given duration (e.g., five minutes). The QoS analysis service can then remove these dead sessions. As another example, the QoS analysis service can identify a state or status of the content (e.g., paused or playing) and modify the timeout duration based on the state or status (e.g., paused sessions can have a longer timeout duration than playing sessions). These are merely examples, and the QoS analysis service can use any suitable technique to identify dead sessions.

At block 504, the QoS analysis service stores session information. In an embodiment, a stateful pipeline may need to be re-started periodically. For example, the stateful pipeline may be updated to a new version or moved to different hardware (e.g., due to faults in existing hardware) or compute nodes, or a number of instances of a stateful pipeline may be changed (e.g., due to changes in the underlying load). In these circumstances, the QoS analysis service needs to be able to recover the current state of each session, after the stateful pipeline is restarted.

In an embodiment, the QoS analysis service can do this by storing a compressed version of each session (e.g., using a fast-caching engine). The compressed version of each session can include only the information needed to reconstruct the current state of the session, in the event the stateful pipeline is restarted. In this embodiment, if the QoS analysis service operating the stateful pipeline receives an event for which it does not have a recorded session, QoS analysis service first attempts to see if a record exists for that session (e.g., a cached record of the compressed version of the session). The QoS analysis service then uses the retrieved compressed version of the session as the base state for the session.

At block 506, the QoS analysis service corrects for out-of-order events. In an embodiment, a variety of factors can result in events being received out-of-order for a given user session. For example, network issues, user device issues, and other issues can result in later occurring events sometimes arriving at the QoS analysis service before earlier occurring events. In an embodiment, the QoS analysis service can correct for this mis-ordering in the stateful pipeline.

For example, as discussed above in relation to blocks 306 and 308 illustrated in FIG. 3, in an embodiment the QoS analysis service treats each recorded row as an immutable ledger and does not modify recorded rows. This can create problems when events are received out of order. For example, the QoS analysis service could receive events indicating playback started at 09:00:00 and ended at 09:01:00. The QoS analysis service would record a metric (e.g., create a row in a relational database) indicating that the session played for 60 seconds. But the QoS analysis service could then receive, out-of-order, a playback paused event timestamped 09:00:50. This indicates that the session actually played for 50 seconds (e.g., from 09:00:00 to 09:00:50) and then was paused for 10 seconds (e.g., from 09:00:50 to 09:01:00).

In an embodiment, the QoS analysis service remedies this problem by recording correction rows indicating the change. The correction rows can include negative values. For example, in the scenario above the QoS analysis service could record a correction row with a negative timing value indicating the pause. This could result in three rows: (1) playing for 60 s, (2) playing for −10 s, and (3) paused for 10 s. Once all the rows for the session are combined, this will create the correct result that the session played for 50 s and was paused for 10 s.

Figure 6:
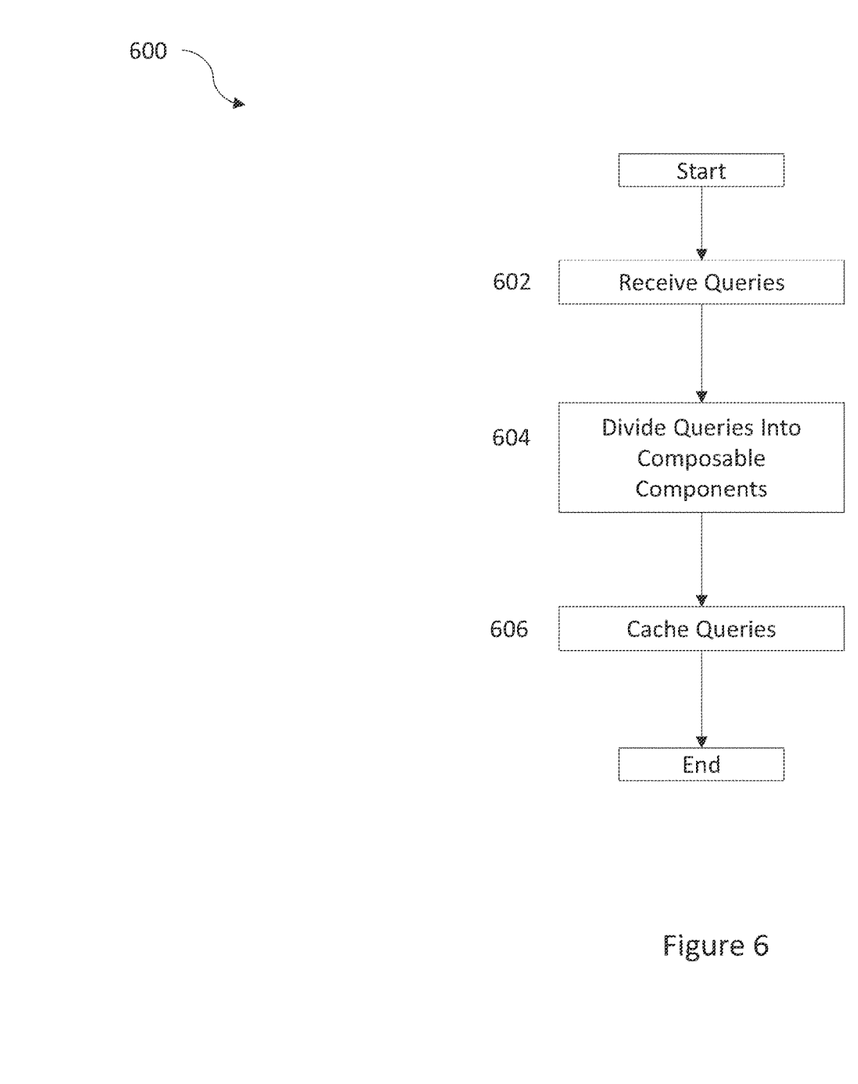
FIG. 6 is a flowchart illustrating querying quality of service data as part of quality of service monitoring for streaming video, according to one embodiment.

FIG. 6 is a flowchart 600 illustrating querying quality of service data as part of quality of service monitoring for streaming video, according to one embodiment. As discussed above, in an embodiment metrics are not initially aggregated when ingested. Instead, real-time (or near real-time) metrics are available by querying the un-aggregated data. Further, the metrics can be aggregated periodically, as discussed above in relation to block 314 illustrated in FIG. 3.

In an embodiment, at block 602 a QoS analysis service (e.g., the QoS analysis service 212 illustrated in FIG. 2) receives one or more queries. These queries can be unfiltered queries, or filtered queries. For example, an unfiltered query can reference one or more events tables in a repository (e.g., using SQL in a relational database). These queries can return metrics using simple queries. For example, the count of session starts for a given time period can be retrieved using a query:

select count (distinct e.session_id)
    from events_started as e
    where e.timestamp>=[start time] and e. timestamp<[end time]

wherein session_id represents a session identifier (e.g., a unique identifier), events_started is a database table recording start events, and timestamp represents a time at which the event occurred.

As another example, a filtered query can reference a subset of sessions. This can be done by, for example, performing a SQL "join" statement into one of the dimension tables (e.g., a table reflecting a dimension of the session). For example, filtering the above query to only sessions originating in the United States could be done using the query:

select count (distinct e.session_id)
    from events_started as e
    inner join dimension_country as d on
        d.date=[date] and d.hour=[hour] and
        d.value='US' and
        e.session_id=d.session_id
    where e.timestamp>=[start time] and e. timestamp<[end time]

wherein dimension_country represents the country where the session originated. In an embodiment, multiple filters can be accomplished by joining into multiple dimension tables.

At block 604, the QoS analysis service divides queries into composable components. In an embodiment, the efficiency of aggregating queries can be greatly improved by using composable queries. For example, compsable queries can be combined with other queries in an efficient manner (e.g., across multiple queries or across time periods).

For example, consider the playback failures metric, which could be defined as a count of playback failures divided by a count of playback ends for a given time period. One implementation might calculate this ratio directly in a repository (e.g., in a relational database using a single SQL query). But this has significant performance drawbacks. A query for this ratio is very likely to be accompanied by a query for a simple number of playback ends for the relevant time period, and using this approach this would require a wholly separate query.

This can be improved by instead performing multiple separate queries to calculate the metric, and storing the result of each separate query. For example, a request for a playback failures metric could be resolved by performing two separate queries, one for playback failures and another for playback ends, storing the result of each query, and then calculating the ratio using the stored results (e.g., rather than performing a separate query). In an embodiment, composable queries can be implemented using SQL queries that all return either a COUNT or a SUM result (e.g., allowing for composition). This is merely one example.

At block 606, the QoS analysis service caches queries. In an embodiment, one or more of the techniques described above (e.g., moving aggregation of metrics from ingest time to query time) can greatly improve compute efficiency and scalability, but can result in more complex queries (e.g., more complex SQL queries) for metrics that are not yet aggregated. This can be alleviated through caching of queries.

For example, as noted above the recorded events and metrics are considered immutable and cannot be changed once recorded. This means that results are static for a given time period, after they are recorded. This allows the QoS analysis service to perform a given query once, and cache the result, without concern that the result will change. For example, the QoS analysis service can use any suitable caching technique (e.g., a least recently used (LRU) cache and a distributed cache, or any other suitable electronic caching technique) to record the results of a query and limit the number of times a query must be performed. This can significantly improve the computational efficiencies of queries.

Further, in an embodiment, caching can be performed only for results occurring sufficiently long in the past to avoid concerns over out-of-order events. As discussed above, in some circumstances events will arrive at a QoS analysis service in a different order from which they occurred. The QoS analysis service can avoid problems from this by only caching results for events that have occurred sufficiently long in the past that the service can be confident that nothing further out of order will be received. For example, the QoS analysis service can use a specified threshold (e.g., 20 seconds) to determine whether a query relates to events that have occurred too recently for caching.

In an embodiment, the QoS analysis service can further improve performance by caching partial queries. As noted above, queries are composable and can be broken down by metric subcomponents (e.g., a query for a ration can be broken down into two queries, one for the numerator and another for the denominator).

In an embodiment, the QoS analysis service can further break queries down by time. For example, a query for a total number of playbacks in a one hour period can be broken down into sixty queries for one minute periods (e.g., each minute of the hour). Each of the minute queries can then be cached individually. A future query for any portion of the hour (e.g., for a fifteen minute segment of the hour) can be resolved using the individual one-minute results in the cache (e.g., combining fifteen of the one-minute results) rather than through a separate query to the repository. As the number of queries grows, the likelihood that any individual query will hit the cache also grows, resulting in a very high cache hit rate where there are a large number of queries. This means that the scenario which most needs a cache, a large number of users querying the repository, will also have the highest cache hit rate.

Further, in an embodiment, the QoS analysis service can use intelligent approximations to improve performance even more. For example, the CIRR metric is defined using two components: buffering time and playing time. For the vast majority of user time, content is provided without noticeable buffering (e.g., streaming video is provided without noticeable buffering to the user). This means that a playing time table will have orders of magnitude more entries than a buffering time table, and that it is consequently much more expensive to query a playing time aspect of CIRR than a buffering time aspect of CIRR.

This can be remedied by approximating playing time, rather than calculating it directly. For example, the QoS analysis service can use a session start time, a session end time, and a buffering duration to calculate the expected playing time: end time-start time-buffering time. While this is not 100% accurate, because other events could intervene and affect the playing time, it is much more efficient to calculate and is very close to accurate. Reducing the load on the repository, by avoiding querying the busier tables, is typically worth the very small trade off in accuracy.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying one or more streaming video sessions for one or more users based on a plurality of events relating to streaming video for the one or more users;
   storing data for the one or more streaming video sessions in an electronic database, based on the plurality of events;
   identifying a plurality of metadata relating to the events;
   determining, based on a threshold value, a time to store at least a portion of the plurality of metadata in the electronic database, the time occurring after storing the data for the one or more streaming video sessions, comprising:
      identifying a target time based on the threshold value;
      calculating a write probability stochastically based on a proximity of a first time to the target time; and
      storing the at least a portion of the plurality of metadata prior to the target time, based on the write probability;
   storing at least the portion of the plurality of metadata in the electronic database at the determined time; and
   responding to a query for metrics relating to the one or more streaming video sessions by aggregating at least a portion of the stored data.

2. The method of claim 1, further comprising:
   de-duplicating the plurality of metadata relating to the events,
   wherein the at least a portion of the plurality of metadata stored in the electronic database comprises the de-duplicated metadata.

3. The method of claim 1, wherein identifying the one or more streaming video sessions for the one or more users based on the plurality of events, further comprises:
   identifying a session state for at least one of the one or more streaming video sessions; and
   modifying the session state based on at least one of the plurality of events.

4. The method of claim 1, further comprising:
   selecting between a stateless pipeline and a stateful pipeline for processing each of the plurality of events.

5. The method of claim 1, further comprising:
   identifying a dead session recorded in the electronic database, and determining to remove the dead session from the electronic database based on one or more characteristics of the dead session;
   storing data sufficient to reconstruct each of the one or more streaming video sessions in an electronic repository; and
   writing one or more correction rows to the electronic database based on the plurality of events, the one or more correction rows relating to events received in a different order from when the events occurred.

6. The method of claim 1, wherein responding to the query for metrics relating to the one or more streaming video sessions by aggregating at least a portion of the stored data further comprises:
   identifying two or more composable aspects of the query;
   querying the electronic database using the two more composable aspects of the query, in place of the query; and
   responding to the query using results of querying the electronic database using the two more composable aspects of the query.

7. The method of claim 6, further comprising:
storing the results of querying the electronic database using the two more composable aspects of the query in an electronic cache.

8. The method of claim 6, wherein the two or more composable aspects of the query comprise two or more components of a ratio, and wherein responding to the query comprises calculating the ratio based on two more or more components of the ratio retrieved from the electronic database.

9. The method of claim 6, wherein the query relates to a time period, the two or more composable aspects comprises subsets of the time period, and responding to the query comprises combining results from the subsets of the time period.

10. A non-transitory computer-readable medium containing computer program code that, when executed by operation of one or more computer processors, performs operations comprising:
identifying one or more streaming video sessions for one or more users based on a plurality of events relating to streaming video for the one or more users;
storing data for the one or more streaming video sessions in an electronic database, based on the plurality of events;
identifying a plurality of metadata relating to the events;
determining, based on a threshold value, a time to store at least a portion of the plurality of metadata in the electronic database, the time occurring after storing the data for the one or more streaming video sessions, comprising:
identifying a target time based on the threshold value;
calculating a write probability stochastically based on a proximity of a first time to the target time; and
storing the at least a portion of the plurality of metadata prior to the target time, based on the write probability;
storing at least the portion of the plurality of metadata in the electronic database at the determined time; and
responding to a query for metrics relating to the one or more streaming video sessions by aggregating at least a portion of the stored data.

11. The non-transitory computer-readable medium of claim 10, further comprising:
identifying a dead session recorded in the electronic database, and determining to remove the dead session from the electronic database based on one or more characteristics of the dead session;
storing data sufficient to reconstruct each of the one or more streaming video sessions in an electronic repository; and
writing one or more correction rows to the electronic database based on the plurality of events, the one or more correction rows relating to events received in a different order from when the events occurred.

12. The non-transitory computer-readable medium of claim 10, wherein responding to the query for metrics relating to the one or more streaming video sessions by aggregating at least a portion of the stored data further comprises:
identifying two or more composable aspects of the query;
querying the electronic database using the two more composable aspects of the query, in place of the query; and
responding to the query using results of querying the electronic database using the two more composable aspects of the query.

13. A system, comprising:
a processor; and
a memory having instructions stored thereon which, when executed on the processor, performs operations comprising:
identifying one or more streaming video sessions for one or more users based on a plurality of events relating to streaming video for the one or more users;
storing data for the one or more streaming video sessions in an electronic database, based on the plurality of events;
identifying a plurality of metadata relating to the events;
determining, based on a threshold value, a time to store at least a portion of the plurality of metadata in the electronic database, the time occurring after storing the data for the one or more streaming video sessions, comprising:
identifying a target time based on the threshold value;
calculating a write probability stochastically based on a proximity of a first time to the target time; and
storing the at least a portion of the plurality of metadata prior to the target time, based on the write probability;
storing at least the portion of the plurality of metadata in the electronic database at the determined time; and
responding to a query for metrics relating to the one or more streaming video sessions by aggregating at least a portion of the stored data.

14. The system of claim 13, further comprising:
identifying a dead session recorded in the electronic database, and determining to remove the dead session from the electronic database based on one or more characteristics of the dead session;
storing data sufficient to reconstruct each of the one or more streaming video sessions in an electronic repository; and
writing one or more correction rows to the electronic database based on the plurality of events, the one or more correction rows relating to events received in a different order from when the events occurred.

15. The system of claim 13, wherein responding to the query for metrics relating to the one or more streaming video sessions by aggregating at least a portion of the stored data further comprises:
identifying two or more composable aspects of the query;
querying the electronic database using the two more composable aspects of the query, in place of the query; and
responding to the query using results of querying the electronic database using the two more composable aspects of the query.

* * * * *